Sept. 4, 1934.　　　J. W. WATSON ET AL　　　1,972,809
PACKING STRUCTURE
Filed Oct. 18, 1930　　　2 Sheets-Sheet 2
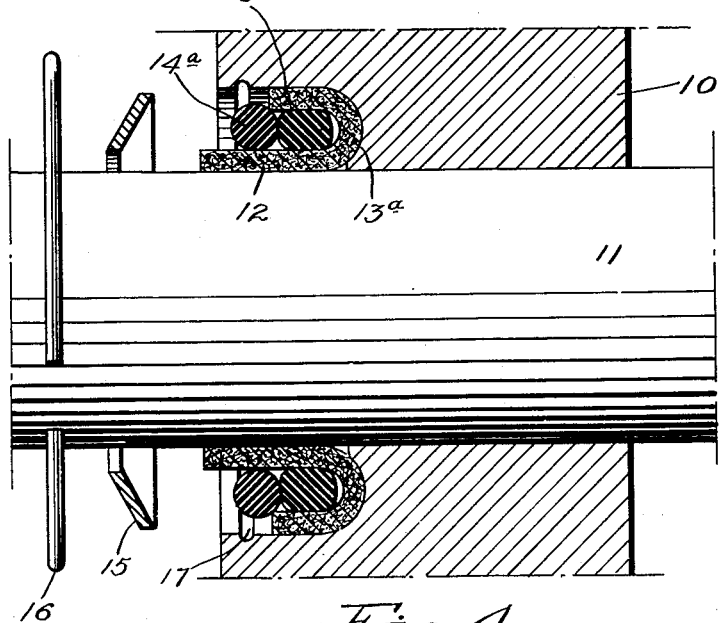
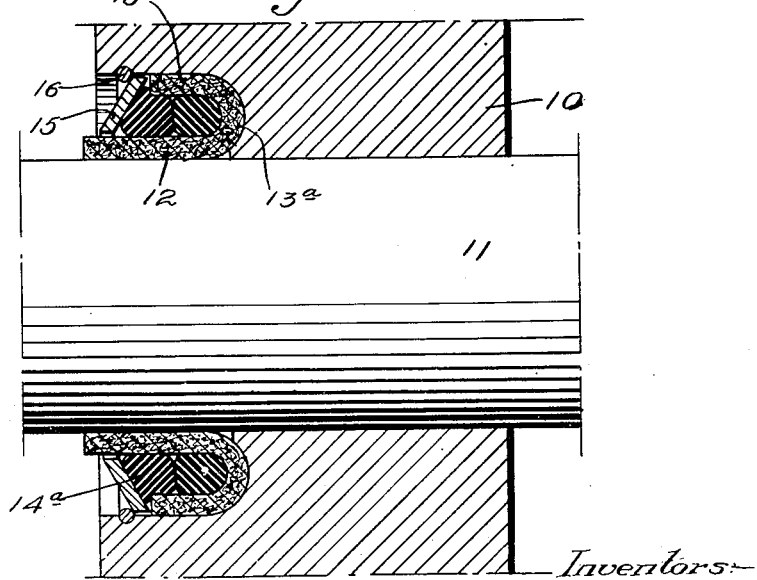
Inventors:—
John W. Watson
Robert F. Nowalk
by their Attorneys
Howson & Howson Patented Sept. 4, 1934

1,972,809

UNITED STATES PATENT OFFICE 1,972,809

PACKING STRUCTURE

John Warren Watson, Wayne, and Robert F. Nowalk, Philadelphia, Pa.; said Nowalk assignor to John Warren Watson Company, Philadelphia, Pa., a corporation of Pennsylvania Application October 18, 1930, Serial No. 489,666

2 Claims. (Cl. 286—5)

This invention relates to a new construction for packings or stuffing boxes and the like.

A particular object of the invention is to provide a packing structure which will automatically prevent leakage between two relatively movable members, such as a rotor and a stator.

A further object is to provide a packing structure as above which will automatically continue to prevent leakage, as above, even after wear has taken place either between the rotor and the stator, or between the rotor and the packing, or between the packing and the stator, as the case may be.

A further object is to provide a packing which will align itself automatically with both the rotor and the stator.

To accomplish all of the above objects and other advantages, as will be made clear in the following drawings and specifications covering the present embodiment of our invention, we employ, broadly, means for deforming rubber or other suitable resilient material and means for confining said rubber or other material in a deformed state in such a manner that the energy put into the material in deforming it will in turn be directed to cause the packing member proper to snugly bear against both of the relatively movable parts such, for example, as a rotor and a stator, and to maintain this snugness throughout a predetermined amount of wear on any of the parts. Particular attention is directed to the fact that the packing member is caused to bear against both of the relatively movable parts. This arrangement permits the rubber or other resilient deformable element to be effectually sealed from the fluid which is being packed off and thus provides against destruction or deterioration of the rubber through its contact with this fluid. The use of rubber in conjunction with the packing element is suggested in the prior application of John Warren Watson, Serial No. 483,095, filed September 19, 1930 for Bearing or packing structure. By the arrangement shown in such application, however, the rubber member is accessible to the fluid and is, therefore, subject to attacks thereof. By the present arrangement, this difficulty is eliminated.

Referring to the accompanying drawings,

Fig. 3 shows a modified construction prior to deformation of the rubber or other resilient material; and Fig. 4 shows this same construction after the deformation of such material.

Figure 1:
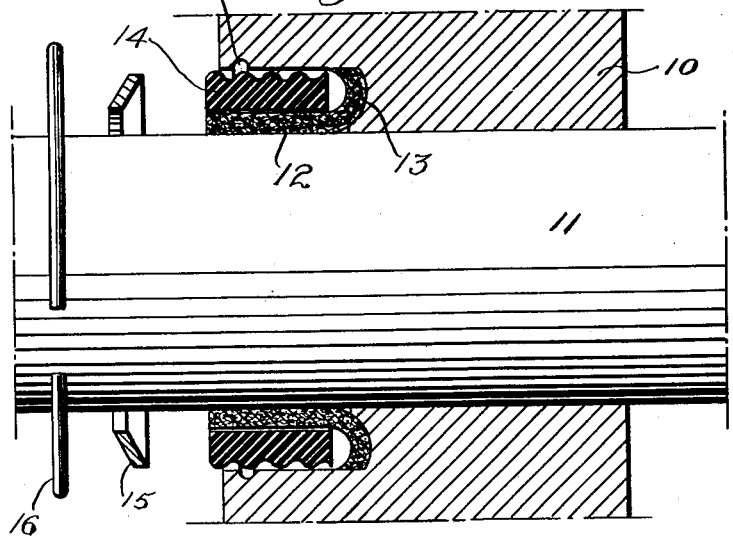
Fig. 1 shows a cross section of a preferred form of our new packing structure, before deforming the rubber or other resilient material.
Figure 2:
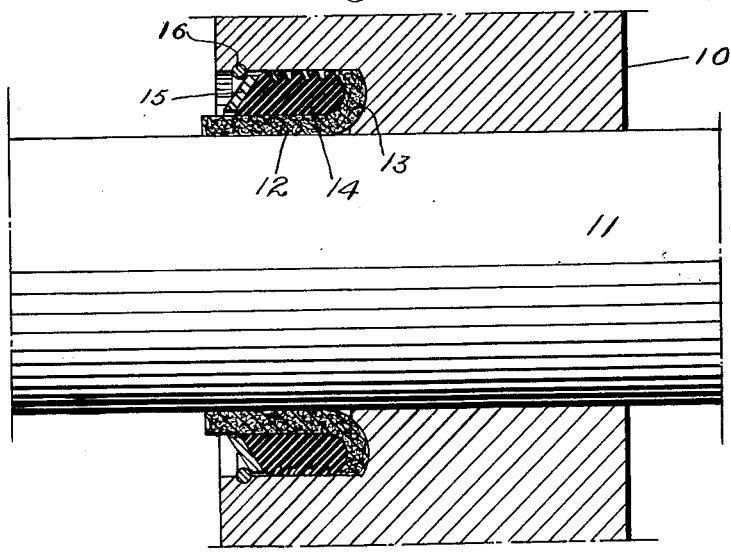
Fig. 2 shows this same construction after deforming the rubber or other resilient material.

Referring now to Figs. 1 and 2 of the drawings, 10 designates a stator or housing; 11 a rotor or shaft mounted in said housing, and 12 a flexible packing member made of any suitable packing material such, for example, as leather, and having a flange 13. The member 12 is of a flexible construction in order to permit its diameter and flange portion 13 to be altered by pressure in order that it may be caused to contact snugly with both the housing 10 and the shaft 11, and may be caused to continue to contact snugly with the housing and shaft even after wear has taken place. Between this packing member 12 and the housing 10 is a member 14 of soft rubber or other suitable resilient material. This member 14, normally, does not entirely fill the cavity formed between members 10 and 12 and is shown in this normal, smaller-than-the-cavity state in Fig. 1.

The numeral 15 designates a washer, 16 a spring ring and 17 a circular groove of semi-circular section for the reception of spring 16. As more clearly shown in Fig. 2, after washer 15 has been forced into place to deform the rubber member 14, spring ring 16 is snapped into grooves 17 and thus holds washer 15 in place and holds rubber member 14 in its deformed state in which it practically entirely fills the cavity now formed by members 10, 12 and 15.

It will now be seen that, due to the tendency of rubber member 14 to regain its normal shape, it is exerting pressure not only radially at all points where it contacts with the packing member 12, but also axially against packing member 12 at all points where it contacts with packing member 12 on its flanged portion 13. Thus, leakage is prevented not only between the shaft or rotor and the packing but also between the body or stator and the packing. Thus leakage through any channel is effectively stopped, and, due to the deformed state of member 14 and due to its inherent desire to regain its normal shape, it will be seen that this stop to leakage will be automatically maintained notwithstanding any normal amount of wear which may take place between the relatively movable parts.

In Fig. 3 of the drawings the construction employed differs from that just described in that the flange 13—a has a reverted terminal 13—b adapted to lie against the peripheral wall of the stator or housing 10 which is remote from the rotor or shaft 11 and in the fact that the member 14—a while composed of rubber or other resilient material as in the first instance is sectionally formed and in its original state constitutes circlets of rubber circular in cross section. It will be obvious that in this construction the rubber when in its compressed state as shown in Fig. 4 will act to press not only the member 12 against the rotor or shaft 11 but likewise to press the flange 13—a and the reverted portion 13—b thereof against the angularly related walls of the housing or stator 10.

The broad idea expressed in the specific illustrations herein shown and described will be found to lend itself to an almost endless number of packing duties. While we have referred above to the use of our packing in connection with members whose movement is relatively rotative, it will readily be seen that our novel packing structure is equally adapted for use in connection with parts having other relative movements such, for example, as plungers.

We claim:

1. In a packing structure, a housing member having an inner wall of substantially cylindrical form, a shaft member axially disposed within said housing wall, flexible packing means surrounding and adapted to contact said shaft member and also adapted to contact said housing wall around its full circumference, rubber means within said flexible packing means and so deformed therewithin as to produce radial pressure against said packing means in the direction of said shaft and in the direction of said housing wall and means to retain said rubber means within said packing means.

2. In a packing structure, flexible packing means adapted to contact the inner cylindrical wall of a housing member and the outer cylindrical surface of a shaft member disposed axially within said cylindrical wall, there being a space within said flexible packing means between that portion which is adapted to contact the housing wall and that portion which is adapted to contact the shaft surface, said space being occupied by a rubber member which is normally of substantially greater dimension in radial section than the radial section dimension of the space in the packing means when the packing structure is in position within the housing and around the shaft whereby, upon operative assembly, said rubber member is axially elongated to produce a radial packing pressure.

JOHN WARREN WATSON.
ROBERT F. NOWALK.